United States Patent
Scully

(10) Patent No.: US 8,752,387 B2
(45) Date of Patent: Jun. 17, 2014

(54) FUEL CONTROL ARRANGEMENT

(75) Inventor: Mark Scully, Derby (GB)

(73) Assignee: Rolls-Royce PLC, London (GB)

( * ) Notice: Subject to any disclaimer, the term of this patent is extended or adjusted under 35 U.S.C. 154(b) by 903 days.

(21) Appl. No.: 12/453,759

(22) Filed: May 21, 2009

(65) Prior Publication Data

US 2009/0320481 A1 Dec. 31, 2009

(30) Foreign Application Priority Data

Jun. 27, 2008 (GB) .................................. 0811741.8

(51) Int. Cl.
*F02C 1/00* (2006.01)
*F02G 3/00* (2006.01)

(52) U.S. Cl.
USPC ................... 60/740; 60/741; 60/746; 60/734; 60/739; 60/39.281; 60/742; 60/773; 60/737

(58) Field of Classification Search
USPC .............. 60/39.281, 739, 740, 734, 773, 741, 60/742–748
See application file for complete search history.

(56) References Cited

U.S. PATENT DOCUMENTS 4,044,553 A * 8/1977 Vaught .......................... 60/39.23
4,738,597 A * 4/1988 d'Agostino et al. .......... 417/282
4,825,641 A * 5/1989 Mandet et al. ............... 60/39.23
4,928,491 A 5/1990 Lindsay et al.
5,159,808 A * 11/1992 Kast ........................... 60/39.091
6,497,100 B2 * 12/2002 Blot-Carretero et al. ....... 60/734
6,955,040 B1 10/2005 Myers, Jr. et al.
7,036,302 B2 5/2006 Myers Jr. et al.

FOREIGN PATENT DOCUMENTS

GB 1103065 2/1968
GB 1 439 764 6/1976

* cited by examiner

*Primary Examiner* — Craig Kim
(74) *Attorney, Agent, or Firm* — Oliff PLC

(57) ABSTRACT

Fuel control arrangements for gas turbine engines generally comprise an injector and a fuel control valve. Typically the fuel control valve is controlled in terms of fuel demand through fuel pressure presented to the valve. Fuel demand may vary and in such circumstances stagnation of fuel adjacent to the valve may cause degradation of the fuel and therefore spurious operational performance. By providing a dedicated working fluid, and typically hydraulic, pressure to the valve a variable aperture port can be displaced to alter the fuel flow configuration within the valve. In such circumstances different fuel valve conditions can be generated by altering the available area of aperture in the port to divert or present fuel to the injector between and across first or primary fuel paths and second or pilot fuel paths as required. Thus more flexibility with regard to fuel presentation to the injector is achieved as well as consistency with respect to avoiding fuel degradation as fuel demand varies.

13 Claims, 2 Drawing Sheets

FUEL CONTROL ARRANGEMENT

The present invention relates to fuel control arrangements and more particularly to fuel control arrangements utilised in gas turbine engines.

Delivery of fuel within a gas turbine engine is important for achieving operational performance. A number of processes have been utilised in the past to control fuel supply within a gas turbine engine. Mechanical systems use rods and/or a unison ring to distribute and control displacement of fuel valves driven from a remote input drive system which is generally fuel pressure controlled typically using fueldraulic servo-activators. Such mechanical systems suffer since care must be taken with physical alignment and use of appropriate bearings, and thermal growth in the rods and unison ring must be considered. It will also be understood that a relatively large number of external dynamic seals are required for the system. Such seals present considerable fire and reliability problems.

More recently hydraulic control systems using pilot pressure to distribute control of fuel through fuel valves have been proposed. U.S. Pat. No. 6,955,040 and U.S. Pat. No. 7,036,302 provide examples of such hydraulically controlled fuel control arrangements and systems. Unfortunately such hydraulically controlled fuel control systems require considerable additional fuel lines and supplies along with wasted flow dynamics to produce the necessary thermal pressure control and to attempt to reduce lacquering of stagnated fuel or temperature damage to slowly moving fuel. Insufficient control of fuel lacquering can lead to valve functional defects. Furthermore, as there are no mechanical interconnections between the fuel valves at each fuel injector it is difficult to achieve the safety and reliability requirements for a convenient yet fully acceptable system.

A further prior approach to fuel control arrangements relates to utilisation of flexible drive actuation processes to control individual fuel valves by a remote drive system. Such flexible drive actuation systems have advantages but it will be understood that the control devices are located at the fuel injectors and so in extremely high temperature environments about an engine core. These environmental considerations do not lend themselves to sensing actual or accurate fuel valve positions and therefore, through feedback control loops, adjusting necessary valve position for fuel requirements and demand. Furthermore there are system problems, typically in relation to assembly and rigging, in ensuring that the assembly is correctly aligned for desired functionality.

It is desirable to both control fuel flow through the injectors to a combustor as well as ensure continued circulation of fuel between primary or first fuel paths and secondary or pilot fuel paths to avoid fuel stagnation and potential degradation.

In accordance with aspects of the present invention there is provided a fuel control arrangement comprising a fuel injector coupled to a fuel control valve, the fuel control valve receiving a fuel flow having a fuel pressure to determine fuel flow rate to the injector through a variable aperture port, the fuel control valve coupled to a hydraulic working fluid pressure source provided remotely from the fuel control valve in a distinct temperature environment location compared to the fuel control valve, the working fluid pressure operating the control valve to alter the available aperture opening area of the variable port aperture dependent upon the working fluid pressure.

Generally, the variable aperture port comprises an aperture and a sleeve, the sleeve displaceable by the working fluid pressure to alter the proportion of the aperture available to the fuel flow. Typically, the variable aperture port comprises a plurality of apertures. Possibly, a sleeve is provided for at least one aperture.

Generally, the fuel control valve is coupled with a primary fuel path and a secondary fuel path either side of the fuel injector. Generally, the variable aperture port is arranged to maintain some fluid flow between the primary fuel path and the secondary fuel path.

Typically, there is a plurality of fuel injectors and coupled fuel control valves. Typically, each fuel injector and fuel control valve is respectively coupled with a fuel manifold for the fuel pressure and fuel flow and a working fluid pressure manifold for the working fluid pressure to the fuel control valve.

Generally, the control valve has a barrier seal to prevent fuel leakage to the working fluid.

Generally, the working fluid pressure source is configured to maintain a working fluid pressure greater than the fuel pressure.

Generally, a controller is provided to configure the working fluid pressure source to provide a desired working fluid pressure to the fuel control valve dependent upon operational conditions.

Also in accordance with aspects of the present invention there is provided a method of operating a fuel control arrangement comprising a fuel injector coupled to a fuel control valve receiving a fuel flow and having a fuel pressure to determine fuel flow rate to the injector through a variable aperture port, the method is arranged to alter the variable aperture port by applying a hydraulic working fluid pressure to change the available aperture opening area, the working fluid provided remotely from the fuel control valve in a distinct temperature environment location compared to the fuel control valve.

BRIEF DESCRIPTION OF THE DRAWINGS

An embodiment of aspects of the present invention will now be described by way of example with reference to the accompanying drawings in which.

DETAILED DESCRIPTION

Figure 1:
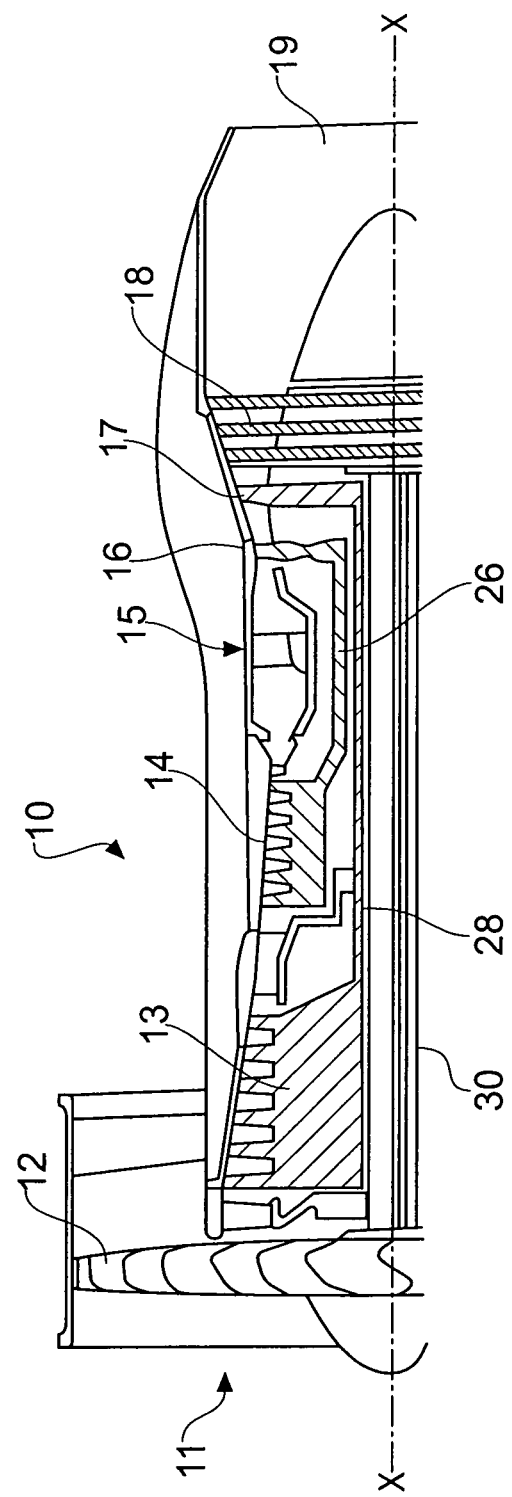
FIG. 1 is a schematic illustration of a gas turbine engine.

Referring to FIG. 1, a gas turbine engine is generally indicated at 10 and comprises, in axial flow series, an air intake 11, a propulsive fan 12, an intermediate pressure compressor 13, a high pressure compressor 14, a combustor 15, a turbine arrangement comprising a high pressure turbine 16, an intermediate pressure turbine 17 and a low pressure turbine 18, and an exhaust nozzle 19.

The gas turbine engine 10 operates in a conventional manner so that the air entering the intake 11 is accelerated by the fan 12 which produce two air flows: a first air flow into the intermediate pressure compressor 13 and a second air flow which provides propulsive thrust. The intermediate pressure compressor compresses the air flow directed into it before delivering that air to the high pressure compressor 14 where further compression takes place.

The compressed air exhausted from the high pressure compressor 14 is directed into the combustor 15 where it is mixed with fuel and the mixture combusted. The resultant hot combustion products then expand through, and thereby drive, the high, intermediate and low pressure turbines 16, 17 and 18 before being exhausted through the nozzle 19 to provide additional propulsive thrust. The high, intermediate and low pressure turbines 16, 17 and 18 respectively drive the high and intermediate pressure compressors 14 and 13 and the fan 12 by suitable interconnecting shafts 26, 28, 30.

As indicated above particular problems relate to the provision of active fuel control arrangements in gas turbine engines. Adjacent the combustor, and therefore the engine core, temperatures are high and therefore fuel degradation may occur which may alter performance, particularly where the fuel pressure is utilised as a servo pressure to actuate a control valve for a fuel injector. Provision of active control arrangements in such high temperature zones is difficult, particularly when feedback control mechanisms are utilised. Variability of measurements and results from sensors can result in spurious control actions as well as reliability problems.

Aspects of the present invention provide a working fluid pressure system to generate a control fluid pressure for fuel control valves installed in close proximity to a fuel injector. By preferably providing the working fluid pressure source remotely, typically towards an engine casing, a lower temperature, more specific and accurate control of working pressure can be achieved. Normally, the working fluid will be oil and therefore a hydraulic actuation system will be provided for the fuel control valve.

An electric motor coupled to a pump is utilised to generate the working fluid pressure. The pressure is regulated using a conventional valve arrangement in order to achieve the desired working fluid pressure to actuate and control the fuel control valve.

It will be appreciated that the working fluid pressure source and associated pipes may add significantly to cost and weight in an aircraft and so may not be practicable unless the fluid pressure system is utilised for other control devices in an engine. In such circumstances the working fluid, and in particular the hydraulic system, will be arranged to operate a number of engine operational systems through appropriate valves.

Figure 2:
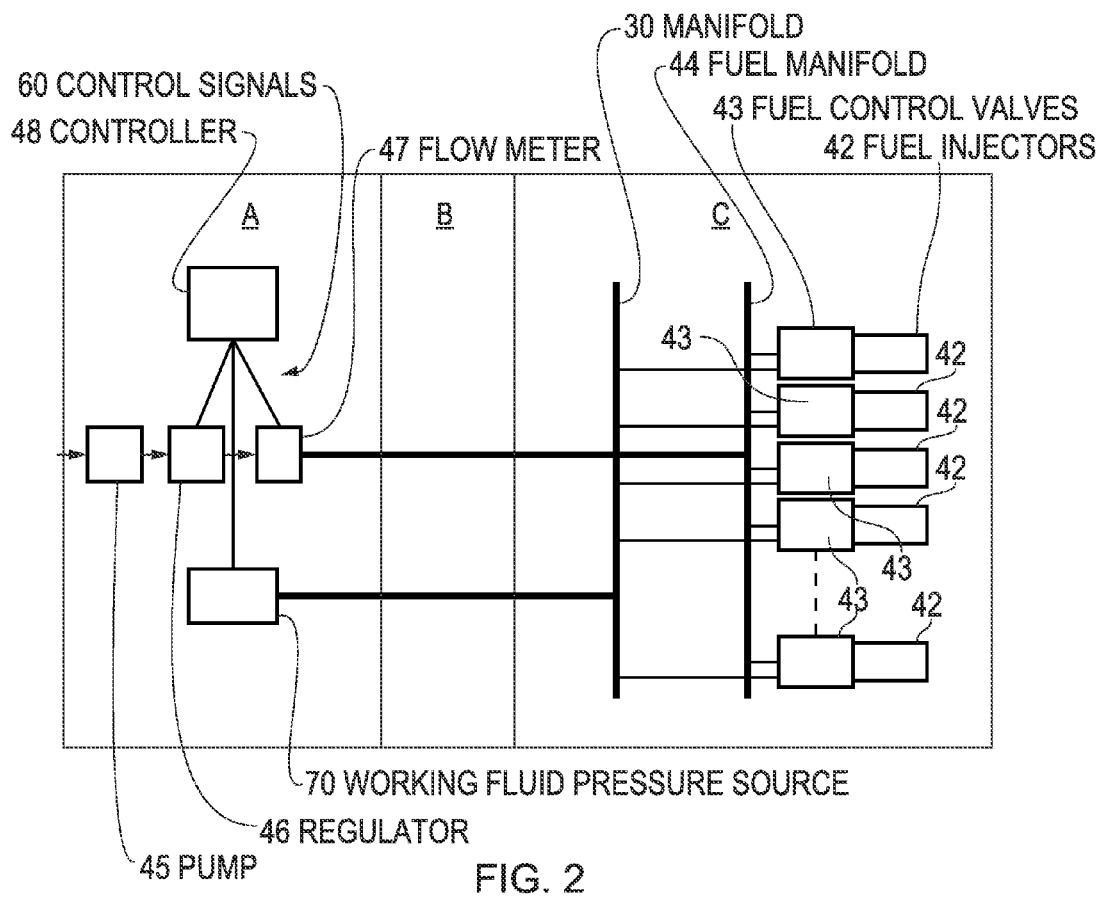
FIG. 2 is a schematic illustration of a fuel control arrangement in accordance with aspects of the present invention; and, FIG. 3 is a schematic illustration of a variable aperture port in accordance with aspects of the present invention.

FIG. 2 provides a schematic illustration of a fuel arrangement in accordance with aspects of the present invention. Thus, an engine comprises zones A, B, C. It will be appreciated that zone C schematically relates to the relatively hot area towards the engine core, adjacent the combustor, and therefore provides a harsh temperature environment. Within zone C fuel injectors 42 are coupled with respective fuel control valves 43 in order to deliver an appropriate fuel flow. Each valve 43 is coupled to a fuel manifold 44 which receives fuel from an appropriate source through a pump 45, a regulator 46 and a flow meter 47. The fluid pressure in the manifold 44 is presented to the valves 43 in order to determine potential fuel flow rate through each valve 43 to the injectors 42.

It will be noted that the pump 45, the regulator 46 and the flow meter 47 are all located in zone A. Zone A is remote from the injectors 42 and valves 43, typically adjacent to the engine casing and thus relatively cool. In this location sensors and other devices used for controlling fuel flow to the manifold 44 will be more reliable, have easier access for maintenance and hence a longer operational life. The flow meter 47 and regulator 46 are coupled to a controller 48. The controller 48 reconciles fuel demands for operation of the engine by sending control signals 60 to the manifold 44. This generates a fuel pressure which is reflected in the fuel passed through the injector 42.

In some instances fuel flow through the valves 43 and injectors 42 may diminish or stop which may cause fuel stagnation in the relatively hot zone C causing problems in consistency of control when based purely on fuel pressure line the manifold 44. The valves 43 and injectors 42 are coupled such that a first or primary fuel flow path is provided to one side of the injector 42 and a secondary or pilot flow path provided to the other side. This means fuel can flow consistently around the circuit created between the first and second fuel flow paths to reduce the likelihood of fuel stagnation. Regulating this recirculation of fuel between the first and second fuel flow paths is the object of the present invention.

In accordance with aspects of the present invention a working fluid pressure source 70 operates through a working fluid manifold 30 to regulate and actuate the control valves 43 in addition to the fuel pressure servo operation described above.

Control signals 60 from the controller 48 are presented to the source 70 to generate demand values for the working pressure presented through the manifold 30 to the valves 43. Working fluid pressure control is generated which has a direct relationship to the required position for the control valves 43 and operation of injectors 42. As illustrated, a manifold 30 is arranged to provide a consistent working fluid pressure to each valve 43 but it will be appreciated that, although adding significantly to complexity, individual manifolds or direct couplings to the valves 43 from the source 70 could be provided such that each valve 43 may be individually set.

By providing a dedicated working fluid control pressure source in accordance with the present invention, consistency in re-circulating fuel within the injector 42 and valve 43 combinations along the first and second fuel flow paths can be achieved.

The fuel control valves 43 incorporate a variable aperture port 49 that comprises a single aperture or hole or a number of apertures through which fuel flows to the injectors 42. Generally the variable aperture port 49 will be additional to existing components within the valve 43.

Figure 3:
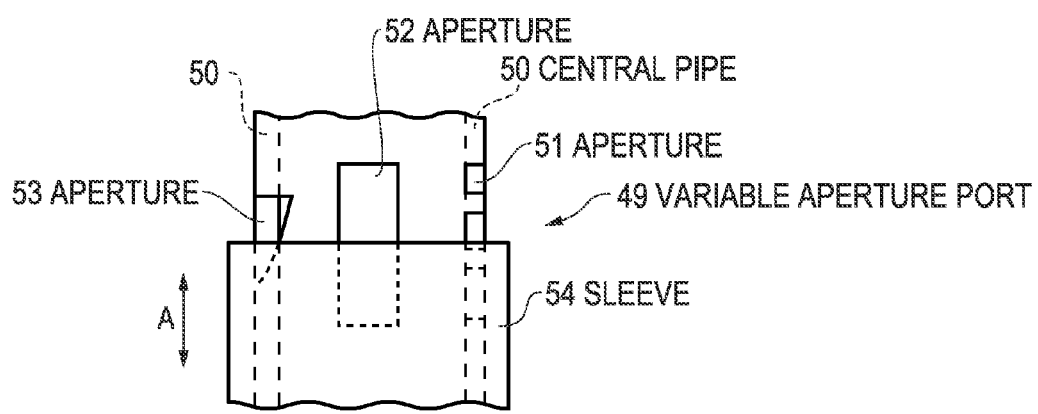

FIG. 3 provides a schematic illustration of a variable aperture port 49 in accordance with the present invention comprising a central pipe 50 that has a number of apertures 51, 52, 53. Different shapes and sizes for the apertures 51, 52, 53 are illustrated in FIG. 3 by way of example but it will be appreciated that consistently sized apertures may preferably be utilised. Furthermore, rather than the apertures 51, 52, 53 all being in alignment circumferentially about the pipe 50 apertures may be provided at different axial heights.

A sleeve 54 is arranged to be displaceable in the direction of arrowheads A to progressively cover or uncover the apertures 51, 52, 53 and thereby vary the available aperture area for fuel flow to the injector 42 (FIG. 2). The sleeve 54 is displaceable by the working fluid pressure. The sleeve 54 may be mounted upon an appropriate bias mechanism, utilising a spring or otherwise, to achieve movements in the direction of arrowheads A. In any event, the apertures 51, 52, 53 will be fully open, partially or fully closed dependent upon requirements. If the apertures 51, 52, 53 are closed then no fuel will flow. If the apertures 51, 52, 53 are fully open then the port 49 is fully open and fuel flow is purely regulated through the fuel pressure as described above. Generally, the port 49 will be configured such that the apertures 51, 52, 53 are never fully closed so that fuel will continue to at least dribble or partially flow to avoid degradation of fuel.

The variable aperture ports 49 are generally provided in each of the valves 43. At full fuel demand the variable aperture ports 49 open and fuel passes through the apertures as required. As demand diminishes the sleeve 54 is displaced to reduce the available open area of the apertures 51, 52, 53 to alter the flow rate to the injectors 42. The fuel pressure is maintained with fuel flow regulated through displacement of the sleeve 54. Preferably the apertures 51, 52, 53 never fully close and therefore a degree of flow rate is still provided through the aperture 51, 52, 53 to maintain fuel circulation. The port 49 may be configured to be open when there is fuel flow demand and closed when there is no fuel flow demand. If closed when there is fuel flow demand it will be appreciated that fuel will be contained within the pipe 50. In such circumstances the control valve 43 provides the fuel through the pipe 50 directly to the injector 42 such that fuel servo pressure operates the valve 43. In the alternative the apertures 51, 52, 53 could be connected to a return pipe between the first and second fuel flow paths. This means that at reduced fuel demands, when the remainder of the valve 43 is preventing injection of fuel through the pipe 50, the apertures 51, 52, 53 are partially open such that fuel circulates up to these apertures 51, 52, 53 and is returned through the second fuel flow path to avoid stagnation.

In the above circumstances each valve 43 generally incorporates a number of discrete flow ports to act as the variable aperture ports 49 between the fuel paths. As the working fluid pressure increases, each valve 43 uncovers different ports or greater proportions of the apertures 51, 52, 53 of the variable aperture port 49 within the valve 43. As the available area changes, the relative fuel distribution between the first and second fuel paths is modified. The variable aperture port 49 at each fuel control valve 43 provide an increased flexibility in fuel distribution to the respective injector 42 by diverting fuel between the first and second fuel flow paths as well as providing the ability to maintain a base level of fuel flow to avoid fuel stagnation.

The working fluid, typically a hydraulic oil, is arranged to flow continuously through a circuit via the manifold 30 to each valve 43. Such an arrangement avoids thermal degradation of the working fluid in the relatively hot zone C.

It will be understood that mixing the fuel and the working fluid cannot be allowed. Therefore, the valves 43 incorporate appropriate barrier seals between the fuel circuit and the working fluid circuit to prevent fuel ingress into the hydraulic oil. Such sealing may add to weight but are necessary for satisfactory control.

As a further approach to preventing leakage of fuel into the working fluid system the source 70 will generally be arranged to maintain the working fluid pressure at a significantly higher pressure than the fuel pressure to ensure that fuel does not leak into the working fluid.

A particular advantage of the present invention is that each valve 43 can be remotely controlled through working fluid pressure provided by the source 70 using control signals 60 from the controller 48 that is located in the relatively cool zone A, remote from the hot injectors 42 and control valves 43 in zone C. Such an approach allows more accurate determination and regulation of the operation of the control valves 43. By location of the controller 48 and the source 70 in a relatively benign temperature environment, a more reliable system with greater flexibility is achieved.

By ensuring there is continuous circulation of the working fluid through the manifold 30 to the valves 43, temperature degradation does not occur. In any event, periodic replacement of the working fluid can be achieved through an appropriate drain near to the source 70.

Modifications and alterations to aspects of the present invention will be appreciated by those skilled in the art. Thus, a single working fluid source 70 may be provided or a number of such sources provided at different locations. Furthermore, by appropriate network couplings at the manifold 30 individual valves 43 or groups of valves 43 may be addressed by the working fluid pressure to control each valve 43. Such elective switching and coupling of different groups of valves 43 and injectors 42 will provide additional benefits in terms of fuel operational efficiency.

The invention claimed is:

1. A fuel control arrangement for a gas turbine engine comprising:
   a fuel control valve having a variable aperture port;
   a fuel injector coupled to the fuel control valve, the fuel control valve receiving a fuel flow having a fuel pressure to determine fuel flow rate to the injector through the variable aperture port;
   a hydraulic working fluid pressure source in a first temperature environment location coupled to and disposed remotely from the fuel control valve in a second temperature environment location, wherein
      the first temperature environment location is distinct from the second temperature environment location, and
   a working fluid pressure, provided by the hydraulic working fluid pressure source, operating the fuel control valve to alter an available aperture opening area of the variable aperture port dependent upon a desired working fluid pressure.

2. An arrangement as claimed in claim 1 wherein the variable aperture port comprises an aperture and a sleeve, the sleeve displaceable by the working fluid pressure to alter a proportion of the aperture available to the fuel flow.

3. An arrangement as claimed in claim 1 wherein the variable aperture port comprises a plurality of apertures.

4. An arrangement as claimed in claim 2 wherein a sleeve is provided for at least one aperture.

5. An arrangement as claimed in claim 1 wherein the fuel control valve is coupled with a primary fuel path and a secondary fuel path, each fuel path being disposed on either side of the fuel injector.

6. An arrangement as claimed in claim 5 wherein the variable aperture port is arranged to maintain some fluid flow between the primary fuel path and the secondary fuel path.

7. An arrangement as claimed in claim 1 wherein each fuel injector and fuel control valve is respectively coupled with a fuel manifold for the fuel flow and a working fluid pressure manifold for the working fluid pressure.

8. An arrangement as claimed in claim 1 wherein the control valve has a barrier seal to prevent fuel leakage to the working fluid.

9. An arrangement as claimed in claim 1 wherein the working fluid pressure source is configured to maintain a working fluid pressure greater than the fuel pressure.

10. An arrangement as claimed in claim 1 wherein a controller is provided to configure the working fluid pressure source to provide the desired working fluid pressure to the fuel control valve dependent upon operational conditions.

11. An arrangement as claimed in claim 3 further comprising a sleeve configured to alter a proportion of at least one aperture available to the fuel flow.

12. An arrangement as claimed in claim 1 comprising:
   a plurality of fuel control valves, each of the fuel control valves having a first end and a second end, the first end of each of the plurality of fuel control valves being directly connected to one of a plurality of fuel injectors and the second end of each of the plurality of fuel control valves being directly connected to both the hydraulic working fluid pressure source and a fuel source.

13. A method of operating a fuel control arrangement for a gas turbine engine including a fuel injector coupled to a fuel control valve having a variable aperture port, the fuel control valve receiving a fuel flow having a fuel pressure to determine a fuel flow rate to the injector through the variable aperture port, the method comprising:
- altering the variable aperture port by applying a hydraulic working fluid pressure to change the available aperture opening area; and
- providing working fluid from a first temperature environment location to the fuel control valve disposed in a second temperature environment location that is distinct from the first temperature environment location.

* * * * *